March 5, 1957 N. R. OLSON 2,783,600
WRAPPING MACHINE
Filed Dec. 24, 1951 7 Sheets-Sheet 6

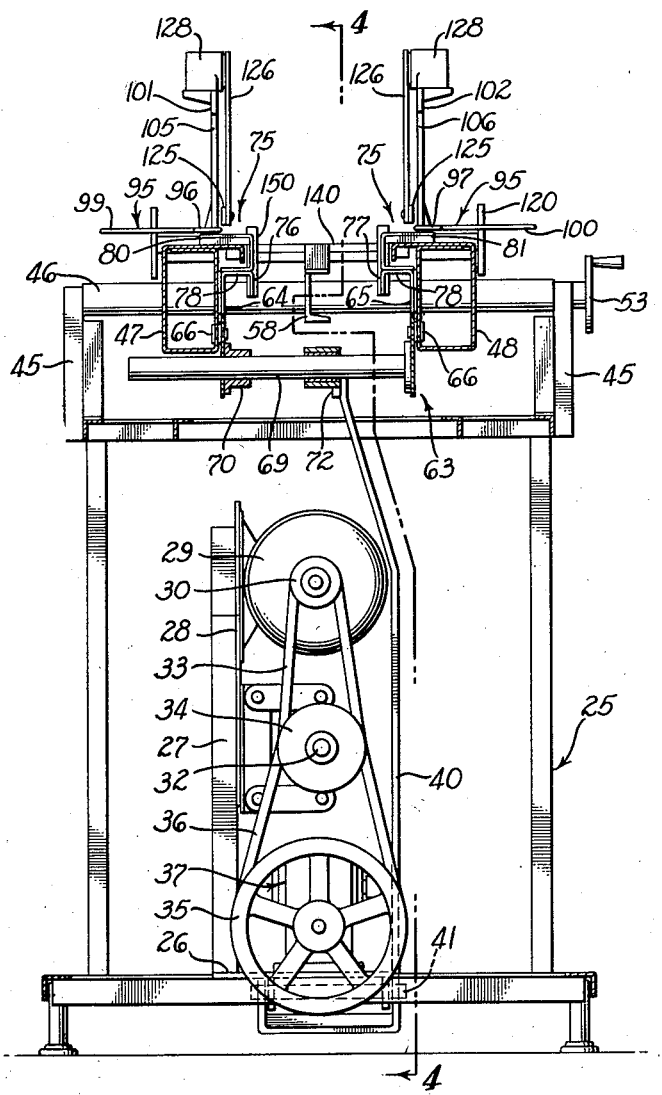

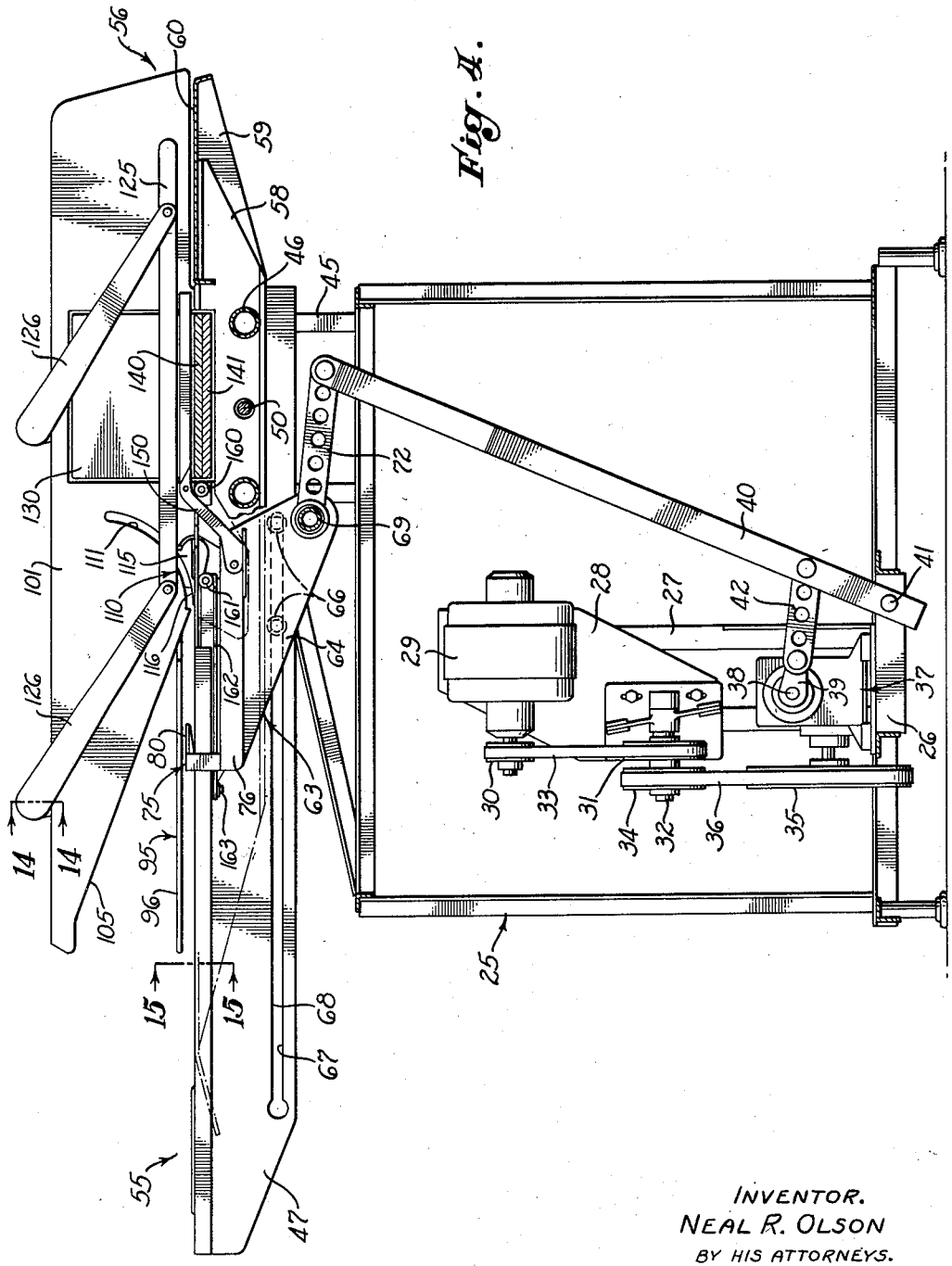

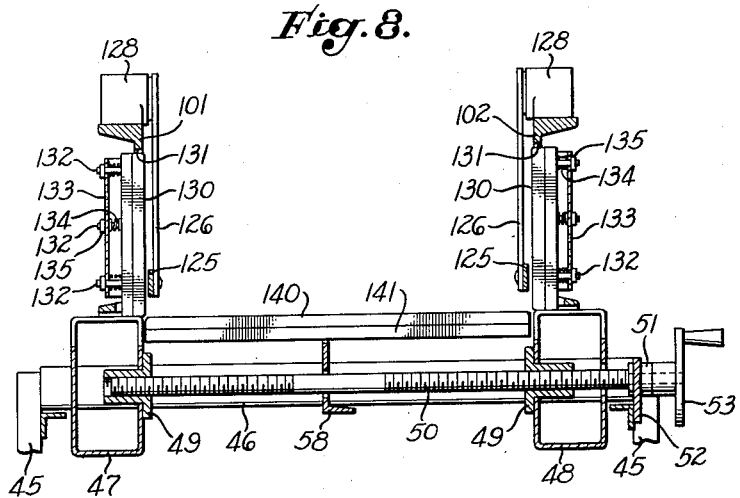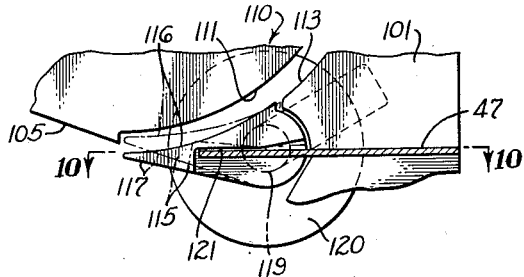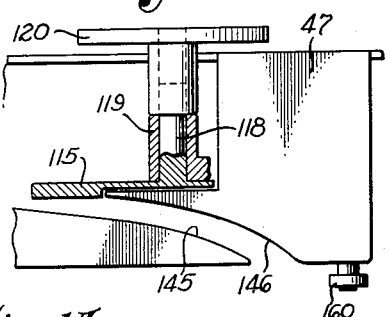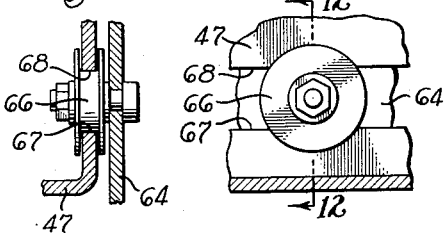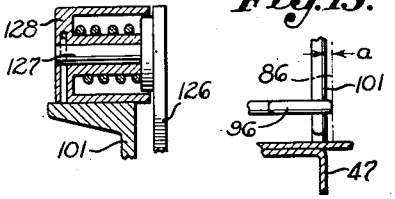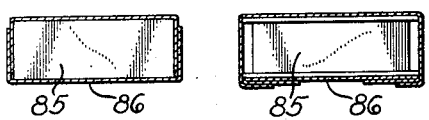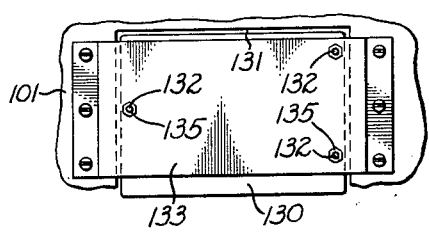

INVENTOR.
NEAL R. OLSON
BY HIS ATTORNEYS.
HARRIS, KIECH, FOSTER & HARRIS
BY

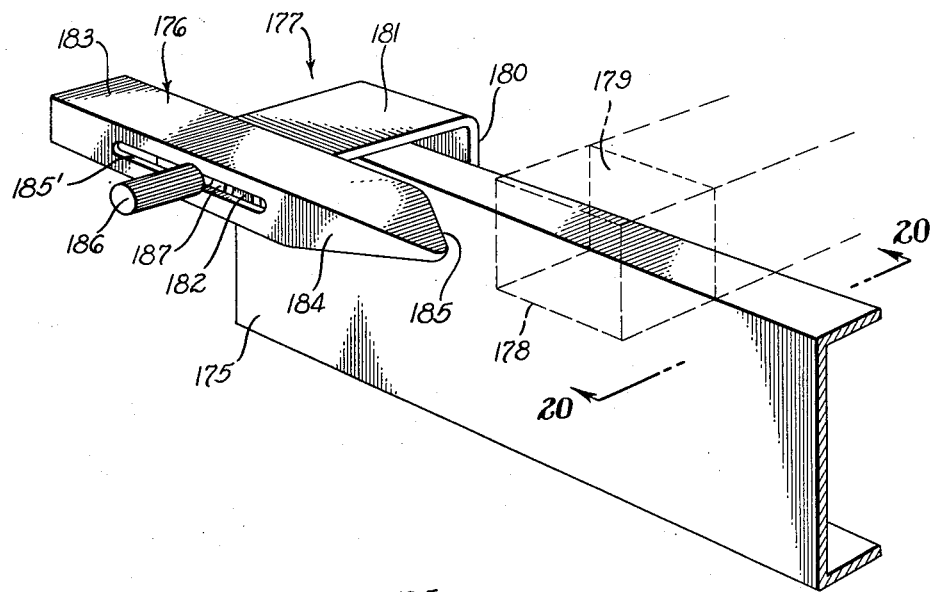
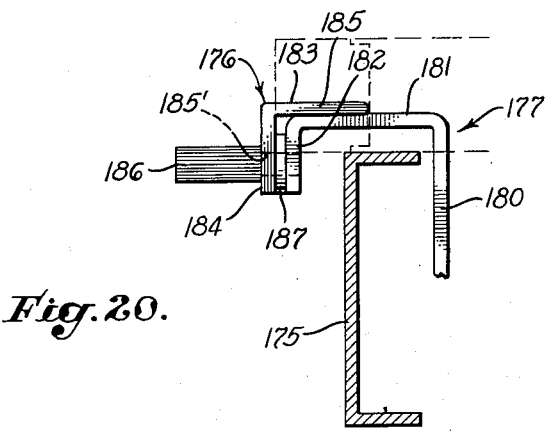

United States Patent Office
2,783,600
Patented Mar. 5, 1957

2,783,600

WRAPPING MACHINE

Neal R. Olson, Sherman Oaks, Calif., assignor to Speed Wrap Incorporated, Denver, Colo., a corporation of Colorado Application December 24, 1951, Serial No. 263,049

18 Claims. (Cl. 53—378)

This invention relates to the packaging art and particularly to a machine for wrapping various articles. Specifically, the invention pertains to a machine for applying protective coverings or wrappers to boxes or small packages in which various articles are packed for shipment or display purposes.

The present improved package wrapping machine has particular utility when employed for applying flexible, plastic wrappers to rectangular boxes, for example, for enclosing cardboard boxes in a protective wrapper or enclosure of a transparent, foldable, cellulose material such as that sold under the trade name "Cellophane," and in the following specification the machine is described in this connection, by way of example.

In the packaging art it is common to enclose boxes and like containers in transparent wrappers so as to effectively protect the boxes to minimize damage thereto and soiling thereof, in some instances the wrapper providing a moisture impervious seal for protecting the contents of the boxes. Such wrappers are usually applied to the boxes in wrapping machines which are specially designed for the purpose. Conventional wrapping machines usually involve quite complicated mechanism for feeding the boxes and for cutting the wrapper material to the required size, folding the material against the boxes and sealing the material. Such machines commonly employ movable tucking and folding elements and since it is difficult to design such machines to provide adjustability so as to accommodate packages of different sizes, it is customary to construct machines which are capable of wrapping only a box of predetermined size. For this reason, it is not unusual to employ a large number of wrapping machines, each adapted to operate on boxes of a particular size, in a plant where packages of various sizes are produced and filled for shipment. While it is within the realm of possibility to so construct such machines to provide adjustability and thus make it possible to wrap boxes of various sizes, within limits, in a single machine, the cost of producing such machines has heretofore been considered prohibitive and consequently the packaging methods and machines discussed above have been tolerated.

It is an important object of the present invention to obviate the deficiencies of previous wrapping machines by providing a machine of this character which is particularly adapted to apply wrappers to rectangular boxes or like containers of various sizes, within prescribed limits, the improved machine being so constructed that a single, relatively simple adjustment prepares the machine for operating upon selected boxes. In this respect, the highly advantageous result is attained by providing a machine which embodies a series of tucking and folding elements, each of which is so formed as to tuck or fold a different flap of the wrapper upon relative movement between the package and the particular elements involved, an important object of the invention being to provide a machine in which the various tucking and folding elements remain stationary, with respect to the package being wrapped, so as to greatly simplify the machine, and this is another object of the invention.

Another important object of the invention is to provide a machine of the type indicated in which the package to be wrapped is fed along a support or bed relative to the stationary tucker and folder means to effect tucking and folding of the flaps at the opposite ends of the wrapper. In the present machine, the package, together with its encircling wrapper, is disposed with its length extending transversely of the support and with the flaps of the wrapper to be folded disposed at opposite longitudinal sides of the support, the package and its wrapper being moved in this position successively to the various folding means, and this is another object of the invention.

Another object is to provide a machine, of the class referred to, in which the longitudinal support is made in two transversely-spaced parts, each part being in the form of a rail upon which an end of the package rests and along which the package is advanced to the successive folding elements. A further important object in this respect is to provide means for adjusting the rails toward and away from each other in accordance with the length of the box or other package to be wrapped, the adjusting means consisting simply of manually rotatable screws engaging the rails and operative to spread the rails apart or draw them closer together, depending upon the direction of rotation of the screws.

Another object is to provide a machine of the type specified in which the means for folding the projecting ends of the wrapper comprises a primary tucker means including a pair of primary tucker elements which function to tuck the rearward vertical portions of the wrapper laterally inwardly against the ends of the package, a secondary tucker means including a pair of secondary tucker elements which are operative to tuck the forward vertical portions of the projecting wrapper ends laterally inwardly against the ends of the package, a primary folder means including a pair of primary folder elements which are adapted to fold the upper horizontal portions of the projecting wrapper ends downwardly in overlying relation to the previously tucked portions, and a secondary folder means including a pair of secondary folder elements which effect upward folding of the lower horizontal portions of the projecting wrapper ends in overlying relation to the aforesaid tucked and folded portions. The machine further includes heater elements operative to seal the overlying end portions to effect a moisture impervious protective covering.

In accordance with the present invention, the primary tucker means comprise a pair of slide elements, which are reciprocable along the support rails as a unit, suitable motor operated means being provided for effecting reciprocation of the same, this being a feature of the invention. A related object is to provide primary tucker means in which each primary tucker element has a forwardly projecting finger, the fingers being spaced apart a distance equal substantially to the length of the package being wrapped so that when the package is slid into position between the fingers, the rearward vertical portions of the projecting wrapper ends are automatically tucked against the ends of the package. The primary tucker elements have rearward pusher portions which serve to push the package forwardly to the secondary tucker elements. It is another object to provide means for preventing rising of the package during its travel through the machine.

The secondary tucker elements consist of stationary bars extending longitudinally along the sides of the support and carried by the primary folder means, the ends of the bars directed opposite to the path of feeding movement of the package being rounded and adapted to engage and tuck the forward portions of the wrapper ends inwardly against the ends of the package, the remaining lengths of the bars serving to retain both tucked portions of the wrapper ends against the package, which is advanced by the primary tucker means to a point adjacent said secondary tucker elements, the form of the secondary tucker elements also being a feature and object of this invention.

Another important object of the invention resides in the primary and secondary folder means, the former comprising a pair of transversely spaced plates, each having a lower inclined folder edge which slopes downwardly in the direction of feed of the package, the upper horizontal portions or flaps of the wrapper ends being adapted to engage these inclined edges and to be folded downwardly thereby during forward motion of the package along the support. As an important feature, the rearward upper ends of the inclined folder edges of the folder plates are disposed at a considerable height above the support while the forward lower ends of the folder edges are located at the approximate level of the top of the support. By this provision, packages having wide ranges of heights can be operated upon, the maximum height being limited only by the distance of the upper end of the folder edge above the support.

Another object is to provide secondary folder means which is simple in construction and positive in action. The secondary folder means consists of a pair of transversely spaced pivoted plate-like folder elements each having an edge which slopes upwardly and forwardly in the direction of travel of the package, the lower end of the sloping edge being normally disposed at a level which is preferably slightly below the level of the top of the support so that as the package advances, the lower flaps of the wrapper ends engage and are folded upwardly against the previously folded upper flaps thereof. Another object in this respect is to provide means for heat sealing the several flaps or folds of the wrapper ends, this means consisting in heater plates across which the folded ends of the wrapper travel to cause the flaps thereof to be fused together.

It is an additional object and feature of this invention to provide auxiliary folder means for folding the upper and lower flaps of the wrapper ends against the bottom of the package, this means consisting in a pair of bottom fold slots in the upper surface of the support, these slots extending inwardly and forwardly from points adjacent the bottom portions of the sloping edges of the pivoted secondary folder elements. By this provision, when the secondary folder elements are pivoted to a position in which their inclined folder edges are disposed out of the path of travel of the bottom flaps and are thus rendered inoperative, the bottom flaps are deflected downwardly by the primary folding means into the bottom fold slots and the lower ends of the folded upper flaps are also caused to enter these slots. During the forward movement of the package the upper and lower flaps are simultaneously folded under the ends of the package by the forward edges of the bottom fold slots. This is an important feature of the invention since it provides means by which sealing of the upper and lower flaps can occur at the bottom of the package and this is highly desirable when wrapping, for example, ornamental candy boxes and like containers in which the edges of the top and bottom project outwardly beyond the intermediate main box portion and thus make it impractical to heat seal the wrapper against the ends of the box.

It is a further object to provide means for positively feeding the boxes successively to the tucking and folding means. As indicated in the foregoing, the primary tucker means also serves as a primary feeding means for advancing each package to the secondary tucker means. The invention provides additional or secondary package feeding means operative to feed the package through the remainder of its necessary travel. The primary and secondary feeding means are reciprocated in timed sequence so that during the feeding of a package from its initial loading position to the secondary tucker means, another package, which was previously so fed by the primary feeding means, is advanced by the secondary feeding means to complete the travel of the package through the machine. In the present improved machine, the feeding means engages only the rearward side of the package to push the same forwardly so that damage to or displacement of the partly applied wrapper is entirely avoided, and this is another object of the invention.

Another object is to provide a machine of the type referred to, in which the supporting rails along which the package is fed are so disposed relative to each other that the ends of the wrapper project laterally beyond the rails and thus are unsupported. By this provision, the ends of the wrapper material are unrestrained and thus allowed to bend freely in a vertical direction during the primary and secondary tucking operations so as to avoid undesirable confining or bunching of the material which might interfere with the proper folding of the top and bottom flaps and which might produce undesirable creases or folds.

Further objects of the invention will appear from the following description and from the drawings, which are intended for the purpose of illustration only, and in which:

Fig. 3 is a vertical sectional view, taken substantially on line 3—3 of Fig. 2;

Fig. 4 is a longitudinal sectional view similar to Fig. 2, taken on line 4—4 of Fig. 3, showing the relation of the parts at the completion of a wrapping operation;

Fig. 5 is a side view of the secondary package feeding or advancing means at the start of its return stroke;

Fig. 6 is a fragmentary plan view of the secondary feeding means;

Fig. 7 is a view similar to Fig. 5, showing the package feeding means during its return movement;

Fig. 8 is a cross-sectional view, taken on line 8—8 of Fig. 1;

Fig. 9 is an enlarged, fragmentary side view of one of the secondary folding means, as viewed in the direction of the arrow 9 in Fig. 1;

Fig. 10 is a sectional plan view, taken on line 10—10 of Fig. 9;

Fig. 11 is an enlarged side view of one of the rollers by which the reciprocating parts are mounted;

Fig. 12 is a cross-sectional view, taken on line 12—12 of Fig. 11;

Fig. 13 is a side view of one of the heating elements for sealing an end of the package wrapper;

Fig. 14 is a cross-sectional view, taken on line 14—14 of Fig. 4;

Fig. 15 is a cross-sectional view, taken on line 15—15 of Fig. 4;

Fig. 16 is a longitudinal sectional view of a wrapped box in which the bottom flaps of the wrapper are folded over the downwardly folded top flaps;

Fig. 17 is a view similar to Fig. 16 in which the top and bottom flaps of the wrapper are folded against the bottom surface of the box;

Fig. 19 is a perspective view of an alternative construction in which the projecting ends of the wrapper are unsupported by the support rails, this view also showing a modified form of primary tucker means; and Fig. 20 is a cross-sectional view, taken on line 20—20 of Fig. 19.

Figure 1:
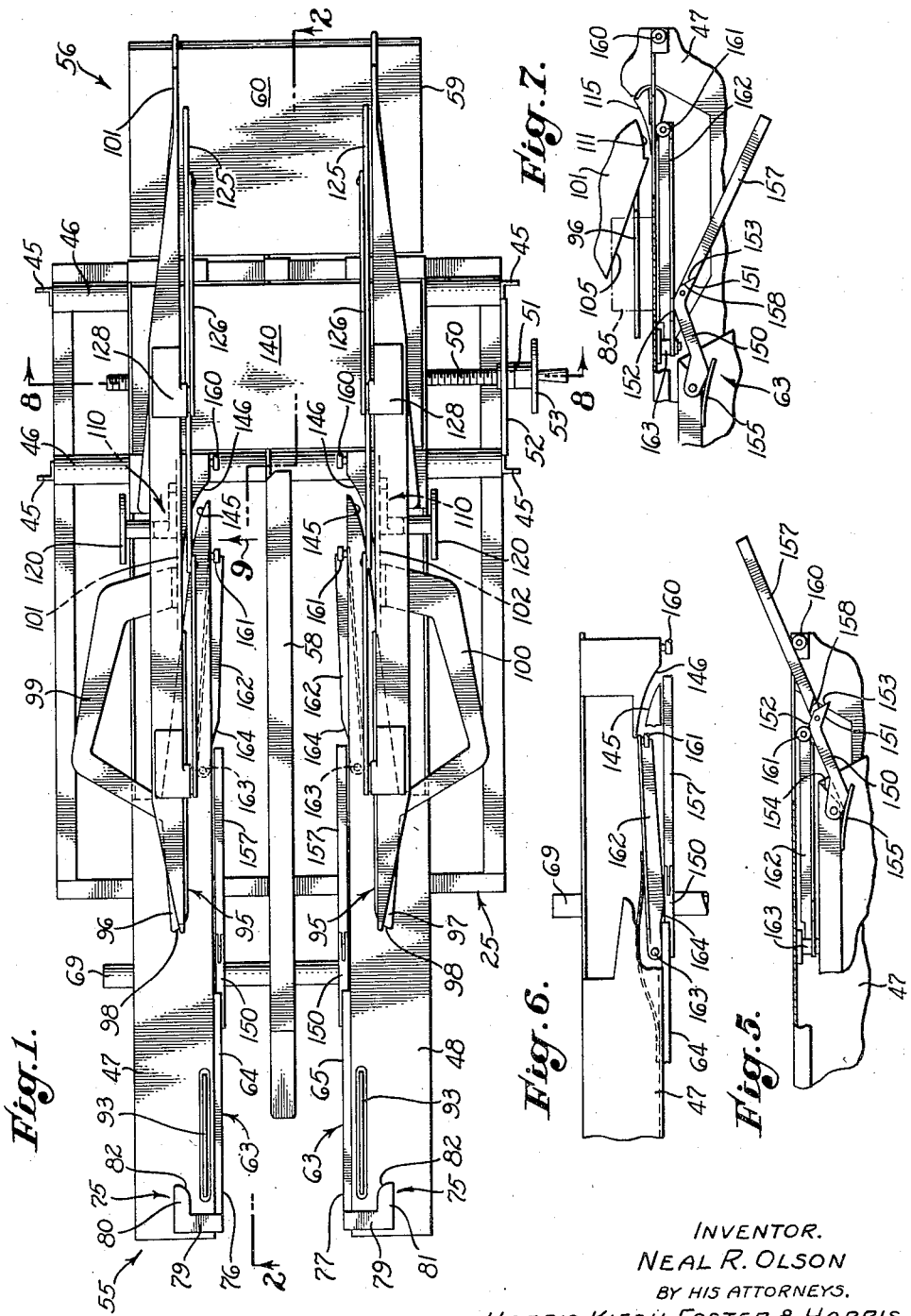
Fig. 1 is a plan view of the wrapping machine, showing the relation of the parts at the start of an operative cycle.

Referring to the drawings in detail, the present improved wrapping machine includes an open lower frame or base 25, herein shown as constructed from angle-iron sections. The frame 25 has a horizontal support 26 which carries a pair of uprights 27. Extending across the uprights 27 is a plate 28 upon which an electric motor 29 is mounted. A pulley 30 on the motor shaft drives a pulley 31, which is rotatable on a countershaft 32, by means of a belt 33. A pulley 34, fast with the pulley 31, drives a larger pulley 35 through the medium of a belt 36. The pulley 35 is connected to drive a speed reduction mechanism which is indicated at 37 in Figs. 2 and 4. The mechanism 37 has a driving shaft 38 which carries a crank arm 39. The crank arm 39 is adapted to oscillate an operating arm 40 which is pivoted at 41 to the frame 25, by means of a link 42. The arm 40 is adapted, when oscillated, to feed a package to be wrapped longitudinally through the machine, the remaining components of the feeding means being constructed and arranged as described hereinafter.

Figure 2:
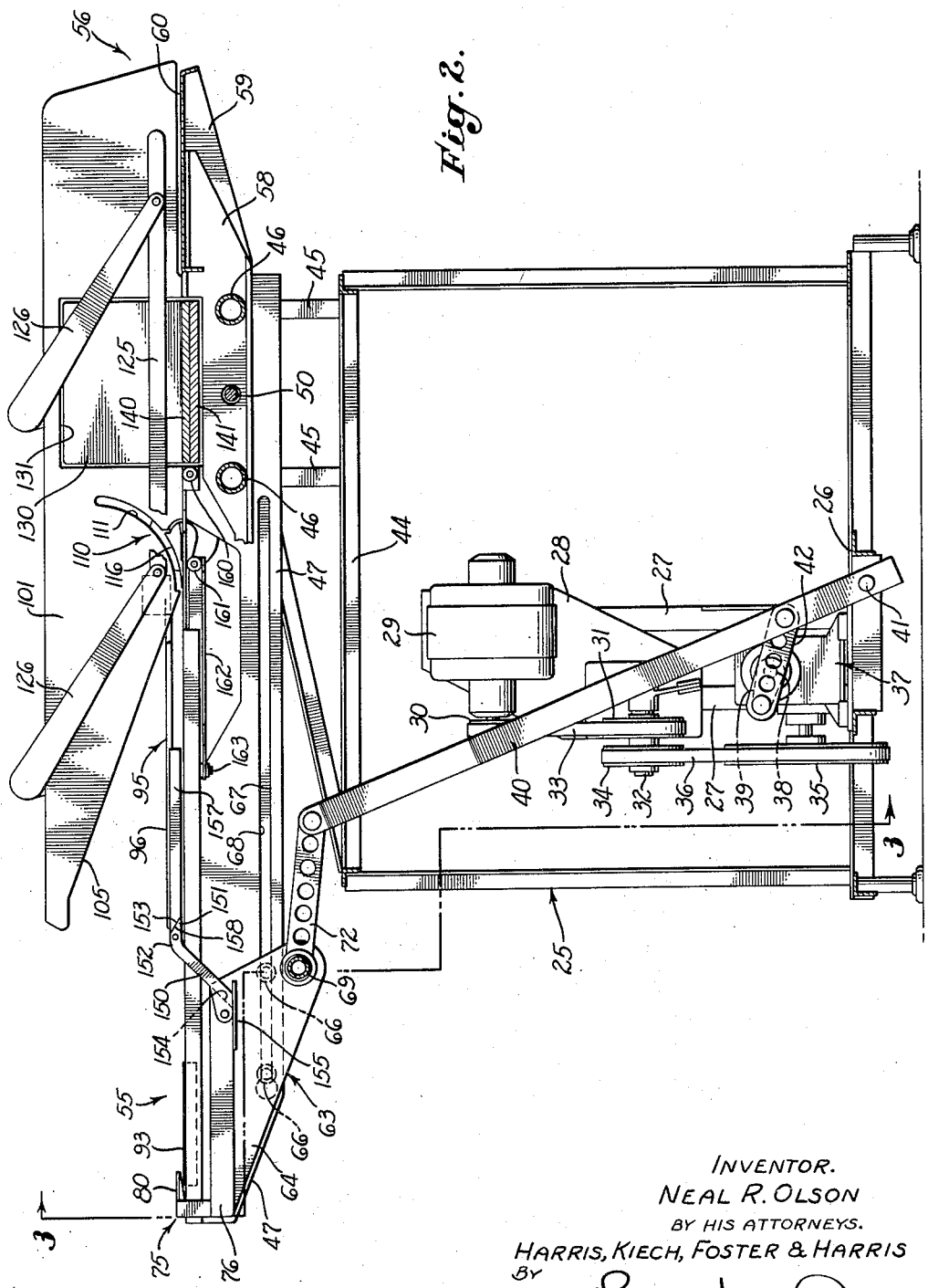
Fig. 2 is a longitudinal sectional view, taken on line 2—2 of Fig. 1, the various parts assuming the same positions as shown in Fig. 1.

Connected to and projecting upwardly from each longitudinal side member 44 at the top of the base 25 is a pair of angle-iron stanchions 45. A pair of tubular beams 46 are secured to and extend between the corresponding stanchions of each pair, transversely of the machine. Slidably mounted on the beams 46 and adapted to be adjusted therealong, transversely of the machine, are longitudinal support rails 47 and 48 which, as shown in Figs. 3 and 8, are rectangular, sheet metal tubes. Secured to the rails 47 and 48 are transversely aligned nut elements 49 through which is screwed the opposite threaded ends of an adjusting member 50, the screw-threads being of opposite hand. An end of the member 50 is rotatable in a bearing 51 (Figs. 1 and 8) carried by a plate 52 extending between the stanchions 45 at one side of the machine, the member being held against axial movement in the bearing. A handwheel 53 is secured to the outer end of the member 50 to facilitate rotation thereof. When the member 50 is rotated, the side rails 47 and 48 are moved simultaneously toward or away from each other, depending upon the direction of rotation, so as to vary the transverse spacing of the rails in accordance with the length of the packages to be wrapped. Referring to Figs. 1, 2 and 4, the loading end of the machine is designated by the reference numeral 55 and the delivery end thereof is indicated at 56. Secured to the crossbeams 46, at the transverse center of the machine, and extending toward the delivery end 56 is an angle-iron bar 58 which carries an inverted box-like member 59, the upper surface 60 of which provides a rest upon which the wrapped packages are delivered after having been fed through the machine.

Adapted to be reciprocated longitudinally of the machine from the loading end 55 to a point substantially midway between the loading and discharge ends is a carriage 63. The carriage 63 comprises a pair of substantially triangularly shaped members 64 and 65 (Figs. 2 and 3) which are adapted to be moved longitudinally along the side rails 47 and 48 in unison. As shown in Figs. 3, 11 and 12, each carriage member carries a pair of flanged rollers 66 which are rollable along tracks 67 formed by the lower edges of longitudinally extending openings 68 in the inner sides of the rails 47 and 48. Secured to the member 65 is a relatively large connector tube 69 which extends transversely of the machine and is slidable in a sleeve element 70 carried by the member 65 (Fig. 3). Pivotally connected to the tube 69 and to the upper end of the operating arm 40 is a link 72. It is thus seen that when the arm 40 is oscillated, the carriage is reciprocated longitudinally along the support rails 47 and 48. Due to the fact that the tube 69 is slidable in the sleeve element 70, relative adjustment of the members 64 and 65 toward and away from each other is possible.

A primary tucker means 75 is adapted to be reciprocated with the carriage 63, said means including a pair of primary tucker elements 76 and 77. The elements 76 and 77 are attached to shelf portions 78 of the carriage members 64 and 65 (Fig. 3) and have horizontal pusher portions 79 which project laterally outwardly in overlying relation to the upper surfaces of the side rails 47 and 48 (Figs. 1 and 3). Projecting forwardly from the pusher portions 79 of the elements 76 and 77 are respective tucker fingers 80 and 81 which have rounded inner corners 82 at their forward ends (Fig. 1).

Figure 18A:
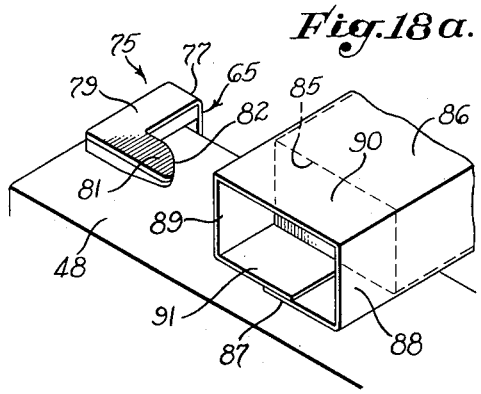
Figs. 18a, 18b, 18c, 18d, 18e and 18f are fragmentary perspective views of one side of the machine, illustrating the successive steps performed by the various tucking and folding elements of the machine in applying a wrapper to a box.
Figure 18B:
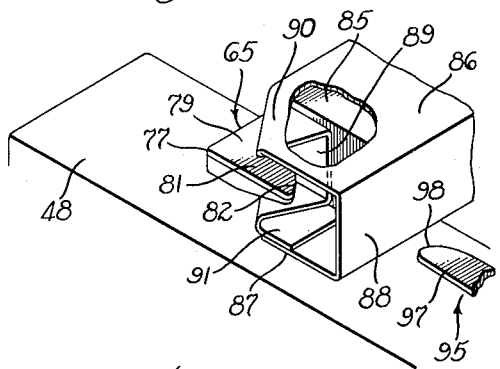

The present wrapping machine is designed for use in applying wrappers of a foldable character to containers, such as cardboard boxes in which various articles are packaged. Referring to Figs. 18a and 18b, the container may take the form of a rectangular box 85 to which a protective covering or wrapper 86 of fusible material is to be applied. It is desirable that the wrapper 86 be folded against the ends of the box 85 and for this reason the wrapper material is cut to a size which permits the material to encircle the box, transversely of the length of the box, with the longitudinal edge portions overlapping as indicated at 87 in Fig. 18a. The length of the wrapper 86 is such that its ends project beyond the ends of the box 85 as shown in Fig. 18a. For the purpose of the description to follow, the sides of the projecting ends of the wrapper 86 may be regarded and designated as a front or forward flap 88, a rearward or back flap 89, a top flap 90 and a bottom flap 91 (Fig. 18a).

The sheet of wrapping material is applied to the box, prior to its insertion in the machine, after which the box, together with its wrapper, is placed across the side rails 47 and 48. The side rails and the tucker elements 75 are adjusted laterally to accommodate the particular box to be wrapped, by means of the adjusting screw 50, this adjustment also serving to space the inner edges of the tucker fingers 80 and 81 apart a distance which is slightly greater than the length of the box. Referring to Fig. 1, the machine embodies means for initially joining the overlapping edges of the wrapper together, this means consisting of a pair of heater elements 93 which are installed in the upper surfaces of the side rails 47 and 48. As the box and its wrapper are placed upon the side rails, the heater elements 93 act to fuse the wrapper material at the joint 87 in spaced lines extending transversely of the box. Thus, the wrapper 86 is retained in the position shown in Fig. 18a, that is, encircling the box 85.

Assuming that the primary tucker means 75 is at the left-hand end of its movement, the operator slides the box and wrapper assembly along the side rails toward the primary tucker means to cause the rearward side of the box to enter the space between the tucker fingers 80 and 81. During this movement of the box, the back flaps 89 engage the rounded corners 82 of the tucker fingers 80 and 81 and these are tucked inwardly by the fingers to a position against the ends of the box as clearly shown in Fig. 18b. Following this primary tucking operation the package is released by the operator and as the primary tucker means is moved forwardly under the action of the operating arm 40 and associated parts, the partly wrapped box is fed forwardly by the pusher portions 79 of the tucker elements 64 and 65 to a secondary tucker means 95 to be next described.

The secondary tucker means 95 consists of a pair of transversely spaced bars 96 and 97 extending longitudinally of the machine at a slight distance above support rails 47 and 48 (Figs. 1 and 4). The rearward end of each bar 96 and 97, that is, the end which is directed toward the loading end 55 of the machine is rounded as indicated at 98. The bars 96 and 97 have loop-like portions 99 and 100 which are suitably connected to respective, longitudinally extending, upright plates 101 and 102 which, in turn, are secured to the respective side rails 47 and 48. It is important to note by reference to Fig. 15 that the inner longitudinal edges of the secondary tucker elements or bars 96 and 97, only one of which is shown in this view, are disposed inwardly of the inner faces of the vertical plates 101 and 102, the dimension $a$ being approximately equal to the combined thicknesses of the end folds of the wrapper.

Figure 18C:
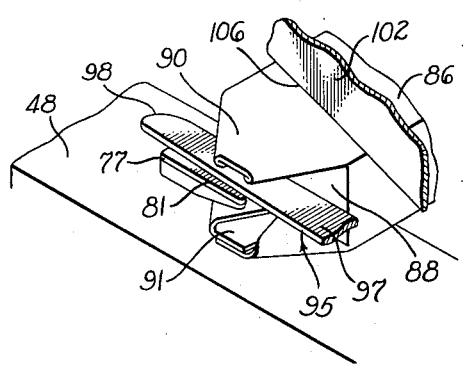
Figure 18D:
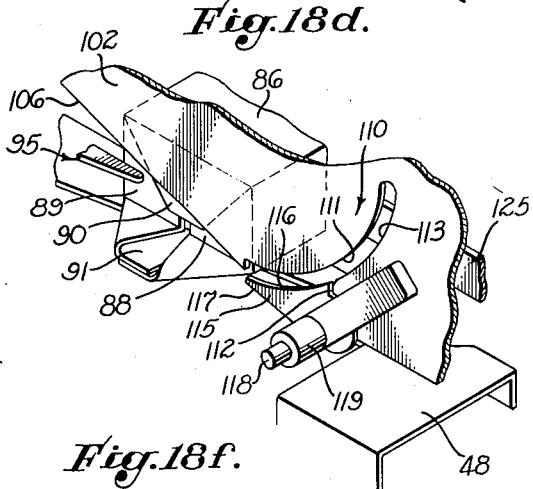

The primary tucker means 75 also constitutes a primary feeding or advancing means and is operative to feed the box 85 forwardly to the position indicated in Fig. 18c. As the partly wrapped box 85 approaches this position, the front flaps 88 of the wrapper ends engage the rounded ends 98 of the secondary tucker elements or bars 96 and 97 and as the box advances with respect to the stationary bars the flaps 88 are tucked inwardly against the ends of the box. At the same time, the previously tucked flaps 89 are also engaged by the bars 96 and 97 and thus are retained in their tucked condition against the ends of the box 85, the relative positions of the box, the wrapper flaps and the primary and secondary tucker means at one side of the machine being clearly shown in Fig. 18c, it being understood that the same relation exists at the opposite side of the machine, which is symmetrical about its longitudinal centerline.

The vertical plates 101 and 102 together provide the primary folding means for folding the top flaps 90 of the wrapper ends downwardly against the ends of the box. As shown best in Figs. 2, 4 and 18c to 18e, the plates 101 and 102 are provided with respective lower inclined edges 105 and 106 which slope downwardly in the direction of feed of the box being wrapped, the forward ends of the edges 105 and 106 terminating at the level of the upper surfaces of the side rails 47 and 48.

A secondary feeding means, to be later described, operates to advance the box 85 forwardly from the position shown in Fig. 18c and during such forward movement of the box the top flaps 90 of wrapper ends engage the inclined edges 105 and 106 of the plates 101 and 102. As the box continues its forward motion, the edges 105 and 106 act with a cam action to fold the flaps 90 downwardly against the previously tucked flaps 89 and 88, the plates 101 and 102 then serving to maintain the three flaps in this relationship. It is important to note that the upper ends of the inclined edges 105 and 106 are located at a level which is a considerable distance above the upper surfaces of the support rails 47 and 48 along which the package slides. It is apparent, therefore, that the machine is capable of wrapping all boxes whose heights are equal to or less than the distance of the upper ends of the inclined edges 105 and 106 above the rails 47 and 48. For example, when the primary and secondary tucker means are disposed at an average distance of, say, one-half inch above the rails 47 and 48, and the upper ends of the inclined edges 105 and 106 are located at a distance of, say, five inches above the rails, boxes ranging in height from about one inch to five inches can be wrapped without requiring vertical adjustment of the tucking and folding elements. It is thus seen that only adjustment of the lateral spacing of the primary and secondary tucking means and the primary folding means to compensate for boxes of different lengths is necessary, and this lateral adjustment of the several components is simultaneously effected by the simple manipulation of the adjusting screw 50.

After having been acted upon by the primary folding means 105, 106 the box is advanced to the secondary folding means, which is indicated generally at 110 in Figs. 1, 2, 4, 9, 18d and 18e. The folder plates 101 and 102 are provided at a point in advance of the primary folding means with slots 111 which curve upwardly in the direction of movement of the package being wrapped. As shown best in Figs. 18d and 18e, each slot 111 extends upwardly and forwardly from a point which coincides with the intersection of the inclined edge 105 or 106 with the lower horizontal edge of the plate 101 or 102. The metal at the intersection between the forward edge of each slot 111 and the lower edge of each plate is cut away as indicated at 112 and located in the space thus formed is a switch member 115 having an upper edge 116 of the same curvature as the forward curved edge 113 of the slot 111, and a lower straight edge 117. Each switch member 115 has an integral pivot stud 118 (Fig. 10) which is rotatable in a bearing 119 carried by a plate 101 or 102. Handwheels 120 are secured to the studs 118 to facilitate pivoting the switch members 115 from the position shown in full lines to that indicated by dot-and-dash lines in Fig. 9, and vice versa. The inner surfaces of the switch members 115 are provided with shoulders 121 which are adapted to engage against the upper surfaces of the side rails 47 and 48 to limit downward pivotal movement of the members to the full line position.

Figure 18E:
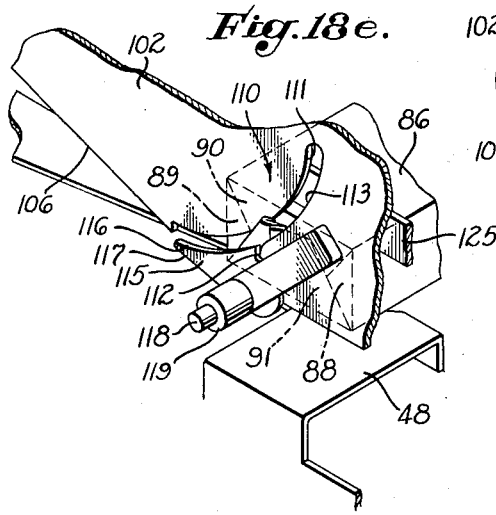

Referring to Fig. 9, when the switch members 115 are pivoted to the full line position, their rearward pointed ends are disposed at a level slightly below the upper surfaces of the side rails 47 and 48 and their curved upper edges 116 provide continuations of the forward curved edges of the folder edges 113 of the slots 111. Consequently, as the partially wrapped box 85 is fed forwardly its bottom flaps 91, which at this time extend laterally from the box in a horizontal plane, enter the folder slot 111 and as the box advances the flaps 91 ride up along the folder cam edges 116, 113 which act to cam the flaps upwardly and inwardly against the previously tucked flaps 89 and 88 and the folded top flaps 90 as clearly shown in Fig. 18e. As the box 85 with its completely folded wrapper 86 is advanced further, the tucked and folded flaps are held firmly against the ends of the box by the plates 101 and 102 along which the flaps slide as shown in Fig. 18e.

During the travel of the box 85 through the secondary folder means, the box may tend to rise from the support rails 47 and 48, especially if the box is light in weight, this condition being due to the upward travel of the flaps 91 in the folder slots 111. The present machine is provided with means for retaining the box against the support rails so as to avoid raising of the box during the secondary folding operation. This hold-down means comprises a pair of horizontal strips 125 which extend longitudinally of the machine adjacent the plates 101 and 102. The ends of the strips 125 are pivotally connected to arms 126 which, in turn, are pivotally mounted at 127 in bearings 128 carried at the upper edges of the plates 101 and 102 (Figs. 1, 2 and 14). The hold-down assemblies 125, 126 are gravity-actuated and thus apply a slight downward force to the forwardly feeding box whose forward upper corner first engages and pivots the rearmost arms 126 to allow the box to move forwardly beneath the strips 125.

After passing through the secondary folder means 110, the box and its completely folded wrapper are fed forwardly toward the delivery end 56 of the machine and during this movement of the box the tucked and folded flaps of the wrapper ends move along vertical heater plates 130, each of which is incorporated in one of the folder plates 101 or 102. Referring particularly to Figs. 8 and 13, each vertical heater plate 130 is slidable laterally through a rectangular opening 131 in a said plate 101 or 102. The heater plates 130 carry screw-threaded studs 132 which extend through apertures in holders 133 fastened to the outer sides of the folder plates 101 and 102. Coil springs 134 surround the studs 132 between the holders 133 and the heater plates 130 and tend to move the heater plates inwardly toward the centerline of the machine. Nuts 135 screwed onto the projecting ends of the studs and set up against the outer surfaces of the holders limit the inward movement of the heater plates. As the wrapped box moves forwardly, its tucked and folded flaps slide across the heater plates 130 which function to heat and fuse the several overlying flaps together so as to seal the ends of the package. The machine is further provided with a horizontal, transversely extending heater plate 140 across which the package moves, the plate 140 being mounted on a holder plate 141 which, in turn, is carried by the angle bar 58. As the edges of the fusible wrapper material 86 which overlap at the seam 87 (Fig. 18a) move across the heater plate 140 they are fused together so that the wrapper is completely sealed to provide a liquid impervious covering for the box or like container.

Figure 18F:
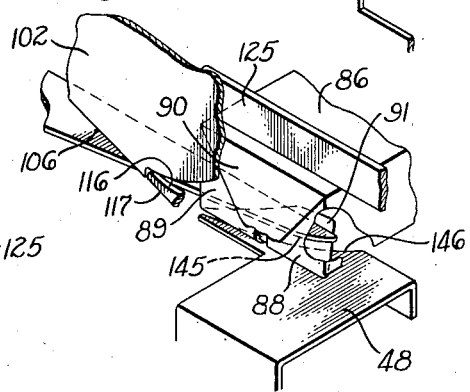

When applying wrappers to some types of boxes, for example candy boxes in which the edge portions of their top and bottom panels project laterally beyond their side portions, it is impractical, and sometimes impossible, to heat seal overlying end flaps of the wrappers against the ends of the boxes. In such cases, it is the usual practice to effect what is termed a "bottom fold" in which the top and bottom flaps are folded under the bottom of the box and sealed in this position. The present machine is also adapted to effect such a folding of the flaps through the use of an auxiliary folder means. Referring to Figs. 1, 10, and 18f, the auxiliary folder means consists of a pair of transversely spaced slots 145 formed in the upper portions of the support rails 47 and 48. As shown best in Fig. 10, each slot 145 curves inwardly and forwardly from a point adjacent the rearward open end of a folder slot 111 and extends through the inner side surface of a rail 47 or 48. The forward edges 146 of the slots 145 provide stationary, curved abutments.

When it is desired to effect a bottom fold, the switch members 115 are pivoted upwardly to the position indicated by dot-and-dash lines in Fig. 9 so that their tip ends extend across the folder slots 111 to render the same inoperative. At the same time, the lower edges 117 of the switch members 115 are brought into alignment with the folder edges 106 to provide continuations thereof. Consequently, as the box advances, the bottom flaps 91 of the wrapper are deflected downwardly by the inclined edges 117. During continued movement of the box, the now downwardly projecting bottom flaps 91 engage progressively more inward portions of the curved abutments 146 and are thus folded thereby against the bottom of the box as shown in Fig. 17. It will be seen by reference to this figure that the top flaps 90 are also folded against the bottom of the box, the folding of these flaps being accomplished simultaneously with the folding of the bottom flaps 91. To produce this form of wrapping, the wrapper material is initially extended beyond the ends of the box to a greater extent so that when the top flaps 90 are folded downwardly by the primary folding means 101, 102, their ends extend to a level below the bottom of the box. By this procedure, the downwardly folded top flaps 90 are caused to enter the slots 145 along with the bottom flaps 91 and to be folded therewith against the bottom of the box, and to be thereafter fused in place by the heater plate 140.

The secondary feeding means for feeding the boxes forwardly from the secondary tucker means 95 to the delivery end 56 of the machine is constructed and arranged as next described. As shown in Figs. 1 and 2 and 4 to 7, a pair of laterally spaced arms 150 are pivoted on the reciprocable carriage 63, each arm terminating in an angular end portion 151, a curved upper edge 152 being provided adjacent this portion. The upper edges of the end portions 151 are inclined as shown at 153. At the start of a wrapping cycle, the carriage assumes the position shown in Fig. 2 and the arms 150 are disposed with their end portions 151 extending in a horizontal, forward direction as also shown in this view, the arms being pivoted upwardly against a stop shoulder 154 by means of leaf springs 155. Pivotally connected to each end portion 151 is a pusher bar 157 which has an inclined stop shoulder 158 normally resting against the inclined upper edge 153 of an end portion 151. The pusher bars 157 thus are normally disposed horizontally above the upper surfaces of the side rails 47 and 48, in position to engage the rearward side of a box 85 and to push the same forwardly during the forward portion of the reciprocatory movement of the carriage 63. By this means, therefore, a box 85 which has previously been advanced to the secondary tucker means 95 is engaged by the free ends of the pusher bars 157 which function to feed the box forwardly through the primary and secondary folder means 101, 102 and 110 and across the heater plates 130 and 140, from which point the box is pushed onto the plate 60 at the delivery end 56 of the machine, each box thus advanced causing the preceding box to be ejected from the plate 60 into a suitable receptacle. It will be understood from the foregoing that as each box is fed from the secondary tucker means 95 to the delivery end of the machine, another box is fed from the loading end 55 to the secondary tucker box by the primary tucker fingers which constitute, in effect, a primary feeding means.

It is necessary that the secondary feeding means 150, 157 be depressed during its return stroke so as to adapt it to move beneath a box, which has at this time been advanced to the secondary tucker means, and to thereafter dispose the pusher bars 157 in the horizontal plane of the box at the rearward side thereof. This depressing means comprises two longitudinally spaced pairs of rollers 160 and 161 (Figs. 1 and 2). The rollers 160 are mounted on the inner surfaces of the side rails 47 and 48, forwardly of the slots 145. The rollers 161 are carried at the forward ends of arms 162 which are pivoted on vertical pins 163 carried by the side rails 47 and 48. The inner longitudinal edges of the arms 162 are provided with cam surfaces 164 (Fig. 1).

Assuming that the machine is in operation, as the carriage 63 starts its forward movement, the pusher bars 157 engage the rearward side of a box 85, previously fed to a position between the secondary tucker bars 96 and 97, and push the box forwardly through the primary and secondary folding means and the heater plates to a delivery position upon the plate 60. During the forward motion of the carriage 63, the forward ends of the pusher bars 157 engage the cam surfaces 164 of the arms 162 so as to pivot the latter outwardly and displace their rollers 161 out of the path of the pusher bars. At a later stage, the pusher bars 157 overlie the rollers 160, as shown in Fig. 4. As the motion of the carriage 63 is reversed, the arms 150 eventually engage the rollers 161 which then act to cam the arms downwardly against the action of the springs 155, as shown in Fig. 5. During this downward pivotal movement of the arms 150, the pusher bars 157 pivot upwardly, due to their engagement with the rollers 160, as shown in Fig. 5. As the reverse movement of the carriage 63 is continued, the curved surfaces 152 of the arms 150 ride under and along the bottom surfaces of the arms 162 and the pusher bars 157 assume a downwardly inclined position, with their inclined shoulders 158 resting upon the inclined ends 153 of the arms 150 (Fig. 7). It is thus seen that the secondary feeding means rides under the partly wrapped box 85, which is indicated by the dot-and-dash lines in Fig. 7.

After the arms 150 are moved beyond the rearward ends of the arms 162, the pusher bars 157 engage therewith to prevent upward pivotal movement of the assemblies 150, 157. However, when the forward ends of the pusher bars 157 ride off the rearward ends of the arms 162, the assemblies are pivoted upwardly to an operative position in which the pusher bars are disposed in the horizontal plane of the box to be advanced, and at the rear thereof as shown in Fig. 2. At the completion of the rearward movement of the carriage 63, the primary tucking means 75 is positioned at the loading end 55 of the machine to receive a new box 85 encircled by the wrapper material. Thus, as the motion of the carriage 63 is again reversed, the new box is fed forwardly to the secondary tucker means 95 and the box which was previously fed to the secondary tucker means is advanced by the secondary feeding means 157 through the primary and secondary folder means to the delivery end of the machine. It is apparent, therefore, that during each oscillation of the operating arm 40 two boxes are operated upon, one fully wrapped box being ejected from the machine at each forward stroke of the feeding means.

It will be observed from the foregoing that the wrapping machine is semi-automatic in operation, it being only necessary to manually place the boxes and their encircling wrappers between the primary tucker fingers, the remainder of the operation being fully automatic. It will be understood, however, that automatic loading mechanism may be provided, and operated in timed sequence with the machine, for placing the packages in the machine. As an important feature of the invention, the several pairs of tucking and folding elements are relatively stationary and the package to be wrapped is moved relative to these elements. By this provision, it is possible to adjust the elements of the several pairs toward and away from each other so as to set up the machine for operating upon articles having different lengths. Another feature resides in the fact that this adjustment of the tucker and folder elements is effected by means of a single screw-type adjusting means so that simultaneous adjustment is attained by the simple manipulation of the screw means and this adjustment can be made with a high degree of accuracy. It has been pointed out that the secondary tucker means and the primary folder means are offset laterally a distance substantially equal to the combined thickness of the overlying flaps of the wrapper. By this provision, the several flaps are not only tucked and folded, but their edges are adequately creased and this results in the production of a wrapper whose ends are pressed firmly against the box or other package to avoid inadvertent loosening or displacement of the wrapper. The present improved wrapping machine is very simple in construction and may be manufactured at a low cost, it being particularly pointed out that the machine has a minimum of moving parts and that these are operated by a single driving means. The machine thus will operate over longer periods of time without servicing, and is generally more efficient in use than machines heretofore used for wrapping boxes and like containers.

Referring now to Figs. 19 and 20 the present invention also contemplates an alternative construction in which the side rails 175 of the machine and the fingers 176 of the primary tucker elements 177 are so arranged relative to each other that the ends of the wrapper 178 for the box 179 project laterally beyond the sides of the rails, the wrapper ends thus being unsupported. Figs. 19 and 20 illustrate a portion of one side only of the machine, it being understood that the other side is of the same construction.

The reference numeral 180 designates one of a pair of arms extending upwardly from a reciprocable carriage which is not illustrated but which may be of substantially the same type as that previously described in connection with the embodiment of the invention shown in Figs. 1 through 18. Each arm 180 has a laterally extending pusher portion 181 overlying the top of one of the rails 175 and a downwardly bent flange 182 disposed outwardly of the rail, the portion 181 providing the pusher portion of the primary tucker element 177. Each primary tucker finger 176 is angular in cross section and has a horizontal side 183 and a vertical side 184, the forward ends of these sides preferably being tapered as indicated at 185 in Fig. 19. The side 183 rests upon the portion 181 of the arm 180 and the side 184 is provided with an elongated opening 185'. A headed thumbscrew 186 passes through the opening 185' and is screwed into a threaded aperture in the portion 182 of the arm 180. Thus, by loosening the thumbscrew 186 the primary tucker finger 176 can be adjusted longitudinally of the arm 180 in accordance with the length of the projecting rearward flap of the wrapper end. As will be apparent, when a large box is to be wrapped, each wrapper end projects a considerable distance beyond the corresponding end of the box. Thus, to effect tucking of each rearward flap of the wrapper end against the end of the box, each primary tucker finger must be of a length which is substantially equal in length to the length of the projecting rearward flap. By the alternative structure shown in Figs. 19 and 20, the effective length of each primary tucker finger 176, that is the distance of the tip 185 of the finger from the forward edge of the pusher portion 181, can be readily varied in accordance with the requirements.

The invention further provides means adjusting the primary tucker fingers 176 laterally inwardly and outwardly with respect to the longitudinal centerline of the machine so as to effect the proper tucking of the rearward flaps of the wrapper ends against the ends of the box. Since each end of an ordinary box may lie close to the outer side of a rail 180, the inner edge of each finger 176 is adjusted to a position in which it substantially aligns with said outer side. This adjustment is accomplished readily by placing a spacer washer 187 of appropriate thickness on each thumbscrew 186 between the flange 182 and the portion 184 of the finger, as shown in Fig. 19. When a box having a top and bottom which overhang the sides and ends of the box is to be wrapped, it is highly desirable that the rearward flap of each wrapper end be tucked against the end of the box. To dispose the inner edge of each finger 176 in a vertical plane which substantially aligns with the recessed end of the box, as indicated by dotted lines in Fig. 19, the portion 184 is disposed directly against the flange 182 without an interposed spacer washer. By this arrangement of parts, the primary tucker fingers 176 act to tuck the rearward flaps of the wrapper ends firmly against the recessed ends of the box.

I claim as my invention:

1. In a package wrapping machine, the combination of: a frame providing a longitudinal support upon which a package having a foldable wrapper encircling the package can be placed with the open ends of the wrapper projecting from opposite ends of the package transversely of said support; primary tucker means including a pair of primary tucker elements movable longitudinally along said support and spaced transversely thereof, said tucker elements including plates slidable along said support and each having a pusher portion extending transversely of said support, the tucking finger of each element projecting forwardly from said pusher portion in said spaced relation to said support, said pusher portions and tucking fingers of said pair of tucker elements together providing a substantially U-shaped unit for receiving the package and its encircling wrapper, and said fingers being adapted to tuck the rearward vertical flaps of the wrapper ends inwardly against the ends of the package upon sliding movement of the package into position between said fingers; means for adjusting said tucker elements toward and away from each other; means including a crank operative to simultaneously reciprocate both tucker elements along said support; secondary tucker means including a pair of secondary tucker elements extending alongside said support and engageable with the forward vertical flaps of the open ends of the wrapper of the forwardly advancing package so as to tuck the same inwardly against the ends of the package; primary folding means including a pair of vertical, transversely spaced, folder plates extending longitudinally along said support and disposed in planes through which the open ends of the wrapper are moved, said folder plates having substantially straight, lower, primary folder edges sloping downwardly in the direction of advancement of the package and adapted to engage and fold the upper flaps of said open ends of the wrapper downwardly, in overlying relation to the tucked forward and rearward end flaps, upon relative movement between said plates and said package; and secondary folding means consisting of curved slots formed at least partially in said folder plates, said slots defining curved cam edges disposed in advance of said folder edges and adapted to be engaged by the lower flaps of the wrapper ends during advancement thereof, relative movement between said package and said cam edges effecting upward folding of said lower flaps in overlying relation to the previously tucked and folded forward, rearward, and upper flaps of the wrapper ends.

2. The combination defined in claim 1 in which said secondary tucker means consists of a pair of bars, each bar being secured to a said folder plate and extending longitudinally along said support, each bar being disposed in a plane above the plane of movement of said tucker fingers to adapt said fingers to move thereunder.

3. The combination defined in claim 1 in which said secondary tucker means consists of a pair of bars, each bar being secured to a said folder plate and extending longitudinally along said support, each bar being disposed in a plane above the plane of movement of said tucker fingers to adapt said fingers to move thereunder, each bar being disposed intermediate said plane of movement and a said primary folder edge.

4. The combination defined in claim 1 in which said secondary tucker means consists of a pair of bars, each bar being carried by a said folder plate and extending longitudinally along said support, each bar being disposed in a plane intermediate the plane of movement of said tucker fingers and a said primary folder edge, the inner longitudinal edge of each bar being disposed in a vertical plane spaced slightly inwardly of the plane of the inner face of the corresponding folder plate.

5. In a package wrapping machine, the combination of: a frame providing a longitudinal support upon which a package having a foldable wrapper encircling the package can be placed with the open ends of the wrapper projecting from opposite ends of the package transversely of said support; primary tucker means including a pair of primary tucker elements movable longitudinally along said support and spaced transversely thereof, said tucker elements having tucking fingers directed toward each other with their facing sides spaced apart a distance substantially equal to the length of the package to be wrapped and adapted to tuck the rearward vertical flaps of the wrapper ends inwardly against the ends of the package upon sliding movement of the package into position between said fingers; feeding means operative to advance said package along said support; secondary tucker means including a pair of secondary tucker elements extending alongside said support and engageable with the forward vertical flaps of the open ends of the wrapper of the forwardly advancing package so as to tuck the same inwardly against the ends of the package; primary folding means including a pair of vertical transversely spaced, folder plates extending longitudinally along said support and disposed in planes through which the open ends of the wrapper are moved, said folder plates having substantially straight, lower, primary folder edges sloping downwardly in the direction of advancement of the package and adapted to engage and fold the upper flaps of said open ends of the wrapper downwardly, in overlying relation to the tucked forward and rearward end flaps, upon relative movement between said plates and said package; secondary folding means consisting in part of curved slots formed at least partially in said folder plates and in part of a pair of switch members, each switch member being movably mounted on said support and having an upper curved edge adapted, when said switch member is moved to one position, to register with and form a continuation of a curved slot, said switch members and slots thereby forming curved cam edges disposed in advance of said folder edges and adapted to be engaged by the lower flaps of the wrapper ends during advancement thereof, relative movement between said package and said cam edges effecting upward folding of said lower flaps in overlying relation to the previously tucked and folded forward, rearward and upper flaps of the wrapper ends, said switch member being adapted, when moved to a second position, to close said curved slot so as to render said secondary folding means inoperative, said switch member having a lower inclined edge sloping downwardly in the direction of feed of the package, said lower inclined edge registering with and forming a continuation of a said primary folder edge, when said switch member is moved to said second position; and means cooperating with said lower inclined edge for folding said lower flaps to a different position than upwardly.

6. The combination defined in claim 5 in which each switch member is pivotally mounted on said support and has a lower inclined edge sloping downwardly in the direction of feed of the package, said lower inclined edge registering with and forming a continuation of a said primary folder edge, when said switch member is pivoted to said second position.

7. The combination defined in claim 6 in which said machine includes interengageable means on said support and said switch members for releasably retaining the latter in either of their positions.

8. In a package wrapping machine, the combination of: a frame providing a longitudinal support upon which a package having a foldable wrapper encircling the package can be placed with the open ends of the wrapper projecting from opposite ends of the package transversely of said support; a pair of primary tucker elements movable longitudinally along said support and spaced transversely thereof, said tucker elements having tucking fingers directed toward each other with their facing sides spaced apart a distance substantially equal to the length of the package to be wrapped and adapted to tuck the rearward vertical flaps of the wrapper ends inwardly against the ends of the package upon sliding movement of the package into position between said fingers; feeding means operative to advance said package along said support; a pair of secondary tucker elements extending alongside said support and engageable with the forward vertical flaps of the open ends of the wrapper of the forwardly advancing package so as to tuck the same inwardly against the ends of the package; primary folding means including a pair of vertical, transversely spaced, folder plates extending longitudinally along said support and disposed in planes through which the open ends of the wrapper are moved, said folder plates having substantially straight, lower, primary folder edges sloping downwardly in the direction of advancement of the package and adapted to engage and fold the upper flaps of said open ends of the wrapper downwardly, in overlying relation to the tucked forward and rearward end flaps, upon relative movement between said plates and said package; secondary folding means consisting of curved slots formed at least partially in said folder plates, said slots defining curved cam edges disposed in advance of said folder edges and adapted to be engaged by the lower flaps of the wrapper ends during advancement thereof, relative movement between said package and said cam edges effecting upward folding of said lower flaps in overlying relation to the previously tucked and folded forward, rearward and upper flaps of the wrapper ends; a pair of switch members pivotally mounted on said support, each switch member having an upper curved edge adapted, when said switch member is pivoted to one position, to register with and form a continuation of a said cam edge, each switch member being adapted, when moved to a second position, to close said curved slot so as to render said secondary folding means inoperative, each switch member having a lower inclined edge sloping downwardly in the direction of feed of the package, said lower edge registering with and forming a continuation of a said primary folder edge when said switch member is moved to said second position, said switch members being adapted to be selectively pivoted to either of said positions; and deflector means for folding each of said bottom flaps of the wrapper downwardly against the under surface of the package, said deflector means consisting of a pair of curved deflector slots formed wholly in the upper surface of said support, each slot curving inwardly and forwardly and having an outer end disposed adjacent a said switch member and in the plane of movement of an end of the package, each slot being adapted to receive a said bottom flap folded downwardly by said bottom inclined edge of a said switch member when the same is in said second position, the forward edge of each deflector slot defining a curved abutment across which a said downwardly folded bottom flap moves to be deflected by said abutment upwardly against the under surface of the package.

9. In a wrapping machine for a package having a foldable wrapper encircling the package with the open ends of the wrapper projecting from opposite ends of the package, the combination of primary tucker means for tucking the rear vertical flaps of the wrapper ends inwardly against the ends of the package; secondary tucker means for tucking the forward vertical flaps of the open ends of the wrapper inwardly against the ends of the package; primary folding means for engaging and folding the upper flaps of the open ends of the wrapper downwardly and in overlying relation to the tucked forward and rearward end flaps; secondary folding means for engaging and folding the lower flaps of the open ends of the wrapper upwardly and in overlying relation to the molded upper flaps; heating means for sealing the folded lower flaps and disposed forwardly of said secondary folding means; means for reciprocating said primary tucker elements through a portion only of the length of said support to feed the package along said support to said secondary tucker elements; a package advancing means operatively connected to and movable with said primary tucker elements and adapted to engage said package and advance the same along said support in one continuous movement from said secondary tucker elements past said primary and secondary folder means and said heating means; and means for reciprocating said package advancing means in synchronization with said primary tucker elements.

10. The combination defined in claim 9 in which said package advancing means includes at least one advancing finger engageable with the rearward side of the package, said operating means including at least one oscillatable arm operatively connected to said primary tucker means and said advancing finger.

11. The combination defined in claim 10 in which said primary tucker means and said advancing finger are carried by a carriage reciprocable longitudinally along said support, said oscillatable arm being operatively connected to said carriage.

12. The combination defined in claim 11 in which said advancing means includes an arm pivoted to said carriage, said advancing finger being pivotally connected to said arm and extending forwardly therefrom.

13. A package wrapping machine as defined in claim 1 in which each primary tucker element includes an arm extending transversely of the machine, each tucking finger being adjustably secured to a said arm.

14. A package wrapping machine as defined in claim 1 in which each primary tucker element includes an arm extending transversely of the machine, each tucking finger being carried by a said arm and adjustable thereon longitudinally of the machine.

15. In a wrapping machine for a package having a foldable wrapper encircling the package with the open ends of the wrapper projecting from opposite ends of the package, the combination of primary tucker means for tucking the rear vertical flaps of the wrapper ends inwardly against the ends of the package; secondary tucker means for tucking the forward vertical flaps of the open ends of the wrapper inwardly against the ends of the package; primary folding means for engaging and folding the upper flaps of the open ends of the wrapper downwardly and in overlying relation to the tucked forward and rearward end flaps; secondary folding means for engaging and folding the lower flaps of the open ends of the wrapper downwardly and beneath the package and simultaneously engaging and folding underneath the package that portion of the downwardly folded upper flaps which extends below the package; heating means for sealing the flaps folded underneath the package and disposed forwardly of said secondary folding means; means for reciprocating said primary tucker elements through a portion only of the length of said support to feed the package along said support to said secondary tucker elements; a package advancing means operatively connected to and movable with said primary tucked elements and adapted to engage said package and advance the same along said support in one continuous movement from said secondary tucker elements past said primary and secondary folder means and said heating means; and means for reciprocating said package advancing means in synchronization with said primary tucker elements.

16. In a wrapping machine for a package having a foldable wrapper encircling the package with the open ends of the wrapper projecting from opposite ends of the package, the combination of primary tucker means for tucking the rear vertical flaps of the wrapper ends inwardly against the ends of the package; secondary tucker means for tucking the forward vertical flaps of the open ends of the wrapper inwardly against the ends of the package; primary folding means for engaging and folding the upper flaps of the open ends of the wrapper downwardly and in overlying relation to the tucked forward and rearward end flaps; secondary folding means for engaging and folding the lower flaps of the open ends of the wrapper upwardly and in overlying relation to the folded upper flaps; means for reciprocating said primary tucker elements through a portion only of the length of said support to feed the package along said support to said secondary tucker elements; a pair of laterally spaced feeding arms pivotally mounted at their rear ends on said reciprocating means; resilient means for holding said arms normally in an upper position; a pusher bar normally extending forwardly and horizontally from each said arm to engage the rear side of a package to advance the same along said support from said secondary tucker elements pass said primary and secondary folder means, each said bar being pivotally connected at its rear end to the forward end of said arm, and each said arm and bar having a connection permitting simultaneous downward movement of said arm and upward movement of said bar but restraining downward movement of said bar relative to said arm; a pair of cam arms disposed at opposite sides of said machine and movable laterally, each said cam arm being engageable by a said feed arm during forward movement thereof to move said cam arm laterally in one direction and each said cam arm being provided with a cam at its forward end; resilient means for urging each said cam arm laterally toward said feed arm and moving each said cam arm back to its previous position when said feed arm moves past the same; and a pair of cam disposed at opposite sides of said machine forwardly of said cam arms for engaging said pusher bars upon downward movement of said feed arms, said feed arms being moved downwardly by said cam on said cam arms upon return movement of said reciprocating means and said pusher bars being held in a lower position by said cams on said cam arms during further return movement, said pusher bars and feed arms thereby passing beneath the next package to be advanced and moving upwardly to a position to engage the rear of said next package when the ends of said pusher bars move past said cams on said cam arms during such return movement.

17. In a wrapping machine, as defined in claim 16, wherein said cams comprise rollers.

18. In a wrapping machine for a package having a foldable wrapper encircling the package with the open ends of the wrapper projecting from opposite ends of the package, the combination of primary tucker means for tucking the rear vertical flaps of the wrapper ends inwardly against the ends of the package; secondary tucker means for tucking the forward vertical flaps of the open ends of the wrapper inwardly against the ends of the package; primary folding means for engaging and folding the upper flaps of the open ends of the wrapper downwardly and in overlying relation to the tucked forward and rearward end flaps; secondary folding means for engaging and folding the lower flaps of the open ends of the wrapper upwardly and in overlying relation to the folded upper flaps; alternative secondary folding means for engaging and folding the lower flaps of the open ends of the wrapper downwardly and beneath the package and simultaneously engaging and folding underneath the package that portion of the downwardly folded upper flaps which extends below the package; and a pair of switching elements disposed in positions corresponding to the opposite ends of said package and each movable to different positions, in one of which the extending lower flap of said wrapper is guided into engagement with said secondary folding means and in another of which said lower flap is guided into engagement with said alternative secondary folding means.

References Cited in the file of this patent
UNITED STATES PATENTS

| | | |
|---|---|---|
| 1,554,369 | Remington | Sept. 22, 1925 |
| 1,634,711 | Ferguson | July 5, 1927 |
| 1,677,924 | Metcalf | July 24, 1928 |
| 1,899,468 | Littlefield | Feb. 28, 1933 |
| 2,052,717 | Littlefield | Sept. 1, 1936 |
| 2,281,887 | Smith | May 5, 1942 |
| 2,367,160 | Werden et al. | Jan. 9, 1945 |
| 2,400,682 | Bronander | May 21, 1946 |